United States Patent
Byun et al.

(10) Patent No.: US 10,708,962 B2
(45) Date of Patent: Jul. 7, 2020

(54) METHOD AND DEVICE FOR TRANSMITTING DATA IN WIRELESS COMMUNICATION SYSTEM

(71) Applicant: LG Electronics Inc., Seoul (KR)

(72) Inventors: Ilmu Byun, Seoul (KR); Jiwon Kang, Seoul (KR); Heejeong Cho, Seoul (KR); Genebeck Hahn, Seoul (KR); Heejin Kim, Seoul (KR); Hyunjin Shim, Seoul (KR); Kilbom Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 16 days.

(21) Appl. No.: 16/091,810

(22) PCT Filed: Apr. 7, 2017

(86) PCT No.: PCT/KR2017/003800
§ 371 (c)(1),
(2) Date: Oct. 5, 2018

(87) PCT Pub. No.: WO2017/179860
PCT Pub. Date: Oct. 19, 2017

(65) Prior Publication Data
US 2019/0166632 A1    May 30, 2019

Related U.S. Application Data

(60) Provisional application No. 62/320,616, filed on Apr. 10, 2016.

(51) Int. Cl.
*H04W 76/11* (2018.01)
*H04W 74/08* (2009.01)
(Continued)

(52) U.S. Cl.
CPC ........... *H04W 76/11* (2018.02); *H04L 5/0007* (2013.01); *H04L 5/0037* (2013.01);
(Continued)

(58) Field of Classification Search
CPC . H04L 25/0204; H04L 5/0007; H04L 5/0037; H04L 5/0048; H04W 52/00;
(Continued)

(56) References Cited

U.S. PATENT DOCUMENTS

| 2011/0085497 A1 | 4/2011 | Fang et al. |
| 2011/0165874 A1 | 7/2011 | Amirijoo et al. |

(Continued)

FOREIGN PATENT DOCUMENTS

| KR | 1020140033774 | 3/2014 |
| KR | 101447750 | 10/2014 |
| KR | 1020150013453 | 2/2015 |

OTHER PUBLICATIONS

International Search Report in International Application No. PCT/KR2017/003800, dated Jun. 27, 2017, 2 pages.

*Primary Examiner* — Kan Yuen
(74) *Attorney, Agent, or Firm* — Fish & Richardson P.C.

(57) ABSTRACT

Provided are a method and a device for transmitting data in a wireless communication system. More particularly, a terminal transmits a first transmission preamble and a second transmission preamble so as to estimate an uplink channel. If a common temporary identifier is assigned to the first and second transmission preambles, a common response message for the first and second transmission preambles is received. If temporary identifiers that are different from each other are respectively assigned to the first and second transmission preambles, respective individual response messages for the first and second transmission preambles are received. Data is transmitted by means of an estimated (Continued)

uplink channel. The first transmission preamble is transmitted in a plurality of resource regions, and the second transmission preamble is transmitted in one resource region.

20 Claims, 11 Drawing Sheets

(51) Int. Cl.
*H04W 52/00* (2009.01)
*H04L 5/00* (2006.01)
*H04L 25/02* (2006.01)
*H04W 72/04* (2009.01)

(52) U.S. Cl.
CPC ......... *H04L 25/0204* (2013.01); *H04W 52/00* (2013.01); *H04W 72/0413* (2013.01); *H04W 74/0833* (2013.01)

(58) Field of Classification Search
CPC ........... H04W 72/042; H04W 72/0406; H04W 72/0413; H04W 74/00; H04W 74/002; H04W 74/004; H04W 74/006; H04W 74/008; H04W 74/08; H04W 74/0833; H04W 76/11; H04W 88/02
See application file for complete search history.

(56) References Cited

U.S. PATENT DOCUMENTS

| | | |
|---|---|---|
| 2013/0301611 A1 | 11/2013 | Baghel et al. |
| 2017/0013643 A1* | 1/2017 | Nan .................... H04W 74/006 |
| 2018/0139021 A1* | 5/2018 | Atungsiri .............. H04L 5/0091 |

* cited by examiner

--Related Art--

--Related Art--

--Related Art--

--Related Art--

METHOD AND DEVICE FOR TRANSMITTING DATA IN WIRELESS COMMUNICATION SYSTEM

CROSS-REFERENCE TO RELATED APPLICATIONS

This application is a National Stage application under 35 U.S.C. § 371 of International Application No. PCT/KR2017/003800, filed on Apr. 7, 2017, which claims the benefit of U.S. Provisional Application No. 62/320,616, filed on Apr. 10, 2016. The disclosures of the prior applications are incorporated by reference in their entirety.

BACKGROUND OF THE INVENTION

Field of the Invention

The present invention relates to wireless communication and, more particularly, to a method for transmitting data in a wireless communication system and an apparatus using the same.

Related Art

A wireless communication system is widely deployed to provide various types of communication services, such as voice and data. An object of a wireless communication system is to enable a plurality of UEs to perform reliable communication regardless of their locations and mobility.

In general, a wireless communication system is a multiple access system capable of supporting communication with a plurality of UEs by sharing available radio resources. Examples of radio resources include time, a frequency, code, transmission power and so on. Examples of a multiple access system includes a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system and so on.

A base station (BS) properly allocates radio resources to each piece of user equipment (UE) within a cell through scheduling. The UE may transmit control information or user data to the BS using the allocated radio resources. In this case, a method for transmitting control information and a method for transmitting user data may be different. Furthermore, a method for allocating radio resources for control information and a method for allocating radio resources for user data may be different. Accordingly, radio resources for control information and radio resources for user data may be different. A BS may differently manage radio resources reserved for control information and radio resources reserved for user data.

In a 3GPP LTE system, a UE in an idle state needs to establish an RRC connection and a data connection before performing data transmission. That is, both a logical connection (RRC connection) between a BS and a UE and a logical connection (S1 connection/interface, EPS connection) between a mobility management entity (MME) and a UE need to be established. For a UE to perform data transmission, time necessary to establish these connections are further taken. However, it is inefficient to establish a connection when a UE transmits or receives a small amount of data once or twice. Therefore, a connectionless transmission scheme may be considered to solve this problem.

SUMMARY OF THE INVENTION

The present invention provides a method and an apparatus for transmitting data in a wireless communication system.

The present invention proposes a method for transmitting data on the basis of a connectionless transmission procedure in a wireless communication system.

Defining terms first, a connectionless transmission procedure may correspond to a procedure in which a user equipment (UE) transmits data to a base station (BS) in a state where a connection between the UE and the BS is not established. Further, the connectionless transmission procedure may correspond to a procedure in which a UE transmits data to a BS in a situation that is not considered as a normal connection state. For example, a case where a radio link failure (RLF) occurs or a case where a UE cannot sense a transmission beam from a BS or senses a very weak beam and thus performs a beam recovery procedure may correspond to a connectionless transmission procedure. A first-type preamble may correspond to a type 1 preamble, which is a random access preamble for connection transmission. A second-type preamble may correspond to a type 2 preamble, which is a random access preamble for connectionless transmission. The second-type preamble includes a first transmission preamble and a second transmission preamble. The first transmission preamble may correspond to a random access preamble for connectionless transmission that is transmitted in a plurality of resource regions. The second transmission preamble may correspond to a random access preamble for connectionless transmission that is transmitted in a single resource region. A plurality of transmission regions may correspond to a plurality of resource regions in which a random access preamble is transmitted. A single transmission region may correspond to a single resource region in which a random access preamble is transmitted. A plurality of resource regions is interchangeable with a plurality of transmission regions. One resource region is interchangeable with a single transmission region. A temporary identifier may include an RA-RNTI.

First, a UE transmits a first transmission preamble and/or a second transmission preamble to a BS in order to estimate an uplink channel. The first transmission preamble and the second transmission preamble are included in a second-type preamble (for connectionless transmission) that is used for transmitting data in a state where a connection between the UE and the BS is not established. That is, the UE transmits the first transmission preamble and/or the second transmission preamble to the BS in order to perform a connectionless transmission procedure. In the connectionless transmission procedure, since data is transmitted while performing a random access procedure, channel estimation needs to be performed when transmitting a preamble. The first transmission preamble and/or the second transmission preamble may correspond to message 1 in the random access procedure.

The first transmission preamble is transmitted in a plurality of resource regions, and the second transmission preamble is transmitted in one resource region. According to an embodiment of the present invention, the first transmission preamble may be used when an uplink channel needs to be estimated for each subband in the connectionless transmission procedure in a broadband system, and the second transmission preamble may be used when the second-type preamble is used for receiving a downlink signal or when an uplink channel can be estimated based on downlink channel estimation information. That is, the second transmission preamble may be used when a random access procedure is performed to receive downlink data or when channel quality is good enough to fully predict an uplink channel state.

When a common temporary identifier is allocated to the first transmission preamble and the second transmission preamble, the UE receives a common response message to the first transmission preamble and the second transmission preamble. When different temporary identifiers are respectively allocated to the first transmission preamble and the second transmission preamble, the UE receives an individual response message to each of the first transmission preamble and the second transmission preamble. The common response message and the individual response message may correspond to message 2 in the random access procedure.

When the first transmission preamble and the second transmission preamble are transmitted at the same time, it is advantageous to allocate the same temporary identifier (common temporary identifier) for the saving of identifier resources. Further, when a response message to the first transmission preamble and a response message to the second transmission preamble are transmitted at a time as a common response message to transmit message 2, it is possible to save resources.

When the first transmission preamble and the second transmission preamble are transmitted at different times (e.g., when these preambles are present in different subframes), different temporary identifiers are allocated to the respective preambles, thereby quickly transmitting a response message to each preamble. For example, when the second transmission preamble is transmitted prior to the first transmission preamble, a response message to the second transmission preamble may be transmitted prior to a response message to the first transmission preamble.

The common temporary identifier and the different temporary identifiers may be determined based on a subframe index and a frequency index of resource regions for transmitting the first transmission preamble and the second transmission preamble.

The resource regions for transmitting the first transmission preamble and the second transmission preamble may be spaced apart from each other in the frequency domain or may be spaced apart from each other in the frequency and time domains. That is, spacing the resource regions for transmitting the first transmission preamble and the second transmission preamble in the frequency domain means that the first transmission preamble and the second transmission preamble are transmitted at the same time. Thus, a common temporary identifier may be allocated to the first transmission preamble and the second transmission preamble. Spacing the resource regions for transmitting the first transmission preamble and the second transmission preamble in the frequency and time domains means that the first transmission preamble and the second transmission preamble are transmitted at different times. Accordingly, different temporary identifiers may be allocated to the first transmission preamble and the second transmission preamble, respectively.

The common response message or the individual response messages include scheduling information for data that can be transmitted through an uplink channel estimated using the first transmission preamble and the second transmission preamble. That is, the BS may transmit, via message 2, an uplink (UL) grant for transmitting uplink data through the uplink channel estimated using the preambles.

The UE transmits data to the BS through the estimated uplink channel. The data may correspond to message 3 in the random access procedure. Here, when the first transmission preamble and the second transmission preamble are transmitted for uplink transmission, the data may correspond to uplink data. When the first transmission preamble and the second transmission preamble are transmitted for downlink signal reception, the data may include information for authenticating the UE. When the UE receives a response signal to the data from the BS, the random access procedure is terminated. The response signal to the data may correspond to message 4 in the random access procedure.

When the UE wishes to perform a random access procedure to the BS based on a connection transmission procedure, the UE may transmit a first-type preamble used for transmitting data in a state where the UE is connected to the BS. Here, when the common temporary identifier is allocated to the first-type preamble, a response message to the first-type preamble may be included in the common response message.

Power consumed for transmitting the first transmission preamble is set to a value predetermined between the BS and the UE. The BS may transmit the predetermined transmission power for the first transmission preamble to the UE as cell-common information. Also, power consumed for transmitting the second transmission preamble is set to be equal to the power consumed for transmitting the first transmission preamble. That is, the power consumption of the UE that transmits a random access preamble in a plurality of transmission regions and the power consumption of the UE that transmits a random access preamble in a single transmission region are matched.

The second-type preamble includes a dedicated preamble allocated to one UE and a common preamble assigned to all UEs in a cell. The dedicated preamble is used when the second-type preamble is used to receive the downlink signal. That is, the BS allocates a dedicated preamble to a UE so as to avoid a collision in the random access procedure.

The present invention also proposes an apparatus for transmitting data on the basis of a connectionless transmission procedure in a wireless communication system.

Defining terms first, a connectionless transmission procedure may correspond to a procedure in which a UE transmits data to in a state where a connection between the UE and a BS is not established. Further, the connectionless transmission procedure may correspond to a procedure in which a UE transmits data to a BS in a situation that is not considered as a normal connection state. For example, a case where a radio link failure (RLF) occurs or a case where a UE cannot sense a transmission beam from a BS or senses a very weak beam and thus performs a beam recovery procedure may correspond to a connectionless transmission procedure. A first-type preamble may correspond to a type 1 preamble, which is a random access preamble for connection transmission. A second-type preamble may correspond to a type 2 preamble, which is a random access preamble for connectionless transmission. The second-type preamble includes a first transmission preamble and a second transmission preamble. The first transmission preamble may correspond to a random access preamble for connectionless transmission that is transmitted in a plurality of resource regions. The second transmission preamble may correspond to a random access preamble for connectionless transmission that is transmitted in a single resource region. A plurality of transmission regions may correspond to a plurality of resource regions in which a random access preamble is transmitted. A single transmission region may correspond to a single resource region in which a random access preamble is transmitted. A plurality of resource regions is interchangeable with a plurality of transmission regions. One resource region is interchangeable with a single transmission region. A temporary identifier may include an RA-RNTI.

The apparatus may be a UE. The apparatus includes a radio frequency (RF) unit to transmit and receive a radio signal and a processor connected to the RF unit. First, the processor transmits a first transmission preamble and/or a second transmission preamble to a BS in order to estimate an uplink channel. The first transmission preamble and the second transmission preamble are included in a second-type preamble (for connectionless transmission) that is used for transmitting data in a state where a connection between the UE and the BS is not established. That is, the UE transmits the first transmission preamble and/or the second transmission preamble to the BS in order to perform a connectionless transmission procedure. In the connectionless transmission procedure, since data is transmitted while performing a random access procedure, channel estimation needs to be performed when transmitting a preamble. The first transmission preamble and/or the second transmission preamble may correspond to message 1 in the random access procedure.

The first transmission preamble is transmitted in a plurality of resource regions, and the second transmission preamble is transmitted in one resource region. According to an embodiment of the present invention, the first transmission preamble may be used when an uplink channel needs to be estimated for each subband in the connectionless transmission procedure in a broadband system, and the second transmission preamble may be used when the second-type preamble is used for receiving a downlink signal or when an uplink channel can be estimated based on downlink channel estimation information. That is, the second transmission preamble may be used when a random access procedure is performed to receive downlink data or when channel quality is good enough to fully predict an uplink channel state.

When a common temporary identifier is allocated to the first transmission preamble and the second transmission preamble, the processor receives a common response message to the first transmission preamble and the second transmission preamble. When different temporary identifiers are respectively allocated to the first transmission preamble and the second transmission preamble, the UE receives an individual response message to each of the first transmission preamble and the second transmission preamble. The common response message and the individual response message may correspond to message 2 in the random access procedure.

When the first transmission preamble and the second transmission preamble are transmitted at the same time, it is advantageous to allocate the same temporary identifier (common temporary identifier) for the saving of identifier resources. Further, when a response message to the first transmission preamble and a response message to the second transmission preamble are transmitted at a time as a common response message to transmit message 2, it is possible to save resources.

When the first transmission preamble and the second transmission preamble are transmitted at different times (e.g., when these preambles are present in different subframes), different temporary identifiers are allocated to the respective preambles, thereby quickly transmitting a response message to each preamble. For example, when the second transmission preamble is transmitted prior to the first transmission preamble, a response message to the second transmission preamble may be transmitted prior to a response message to the first transmission preamble.

The common temporary identifier and the different temporary identifiers may be determined based on a subframe index and a frequency index of resource regions for transmitting the first transmission preamble and the second transmission preamble.

The resource regions for transmitting the first transmission preamble and the second transmission preamble may be spaced apart from each other in the frequency domain or may be spaced apart from each other in the frequency and time domains. That is, spacing the resource regions for transmitting the first transmission preamble and the second transmission preamble in the frequency domain means that the first transmission preamble and the second transmission preamble are transmitted at the same time. Thus, a common temporary identifier may be allocated to the first transmission preamble and the second transmission preamble. Spacing the resource regions for transmitting the first transmission preamble and the second transmission preamble in the frequency and time domains means that the first transmission preamble and the second transmission preamble are transmitted at different times. Accordingly, different temporary identifiers may be allocated to the first transmission preamble and the second transmission preamble, respectively.

The common response message or the individual response messages include scheduling information for data that can be transmitted through an uplink channel estimated using the first transmission preamble and the second transmission preamble. That is, the BS may transmit, via message 2, an uplink (UL) grant for transmitting uplink data through the uplink channel estimated using the preambles.

The processor transmits data to the BS through the estimated uplink channel. The data may correspond to message 3 in the random access procedure. Here, when the first transmission preamble and the second transmission preamble are transmitted for uplink transmission, the data may correspond to uplink data. When the first transmission preamble and the second transmission preamble are transmitted for downlink signal reception, the data may include information for authenticating the UE. When the UE receives a response signal to the data from the BS, the random access procedure is terminated. The response signal to the data may correspond to message 4 in the random access procedure.

When the UE wishes to perform a random access procedure to the BS based on a connection transmission procedure, the UE may transmit a first-type preamble used for transmitting data in a state where the UE is connected to the BS. Here, when the common temporary identifier is allocated to the first-type preamble, a response message to the first-type preamble may be included in the common response message.

Power consumed for transmitting the first transmission preamble is set to a value predetermined between the BS and the UE. The BS may transmit the predetermined transmission power for the first transmission preamble to the UE as cell-common information. Also, power consumed for transmitting the second transmission preamble is set to be equal to the power consumed for transmitting the first transmission preamble. That is, the power consumption of the UE that transmits a random access preamble in a plurality of transmission regions and the power consumption of the UE that transmits a random access preamble in a single transmission region are matched.

The second-type preamble includes a dedicated preamble allocated to one UE and a common preamble assigned to all UEs in a cell. The dedicated preamble is used when the second-type preamble is used to receive the downlink signal.

That is, the BS allocates a dedicated preamble to a UE so as to avoid a collision in the random access procedure.

According to the proposed scheme, a BS receives a random access preamble and predicts uplink channel quality per subband through the random access preamble, thereby enabling connectionless uplink transmission using efficient resources. In addition, this scheme may be useful particularly in a broadband system that is a wide-band communication system.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE/LTE-A. However, technical features of the present invention are not limited thereto.

Figure 1:
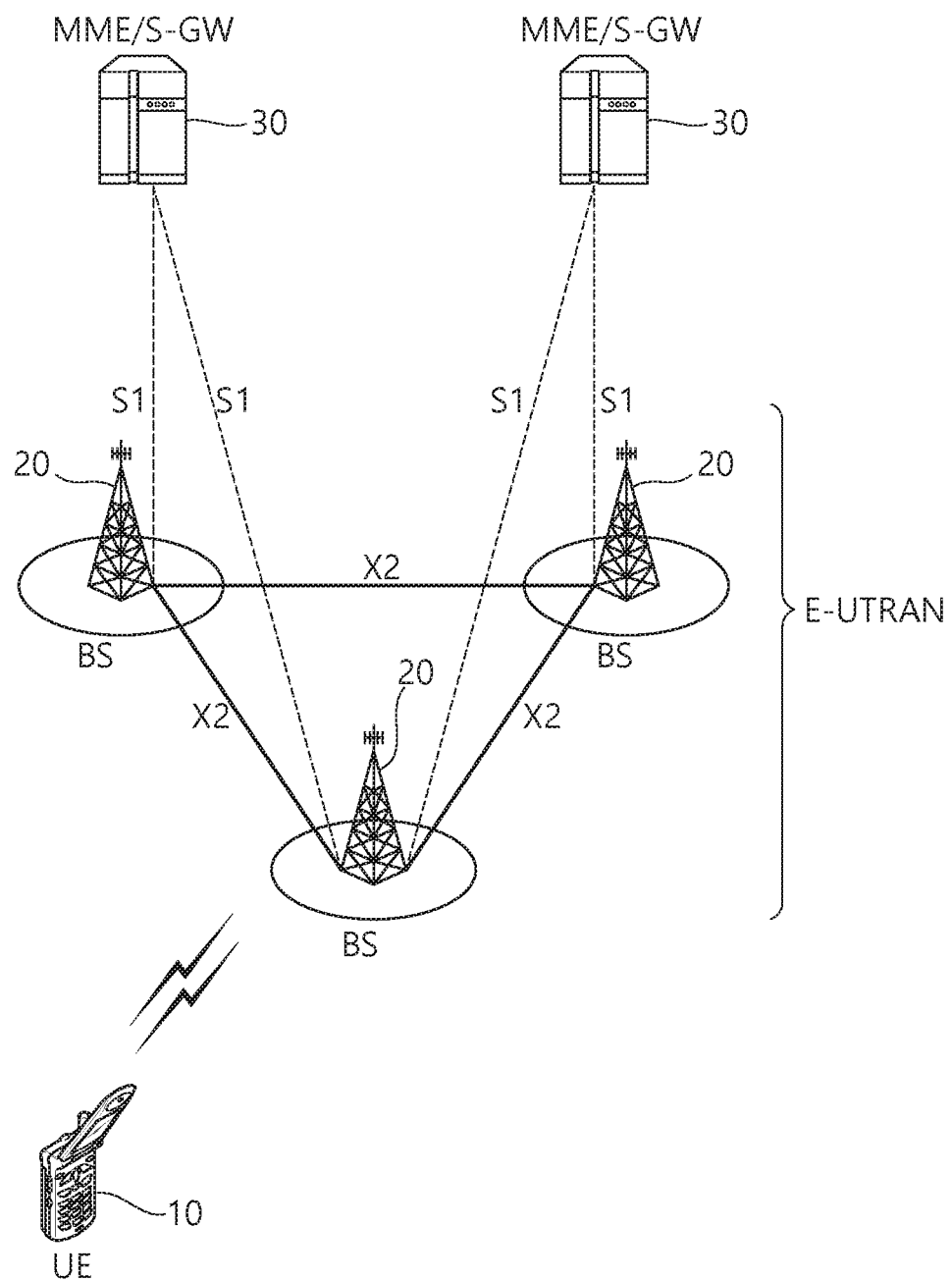
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is called a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
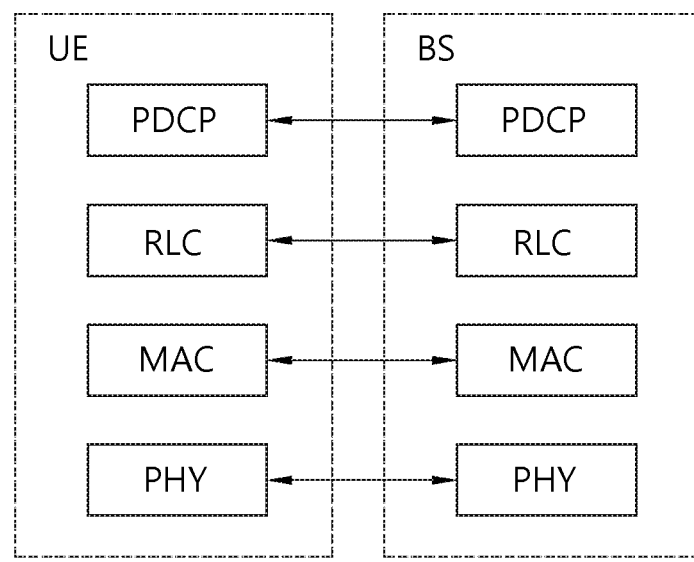
FIG. 2 is a diagram illustrating a radio protocol architecture for a user plane.
Figure 3:
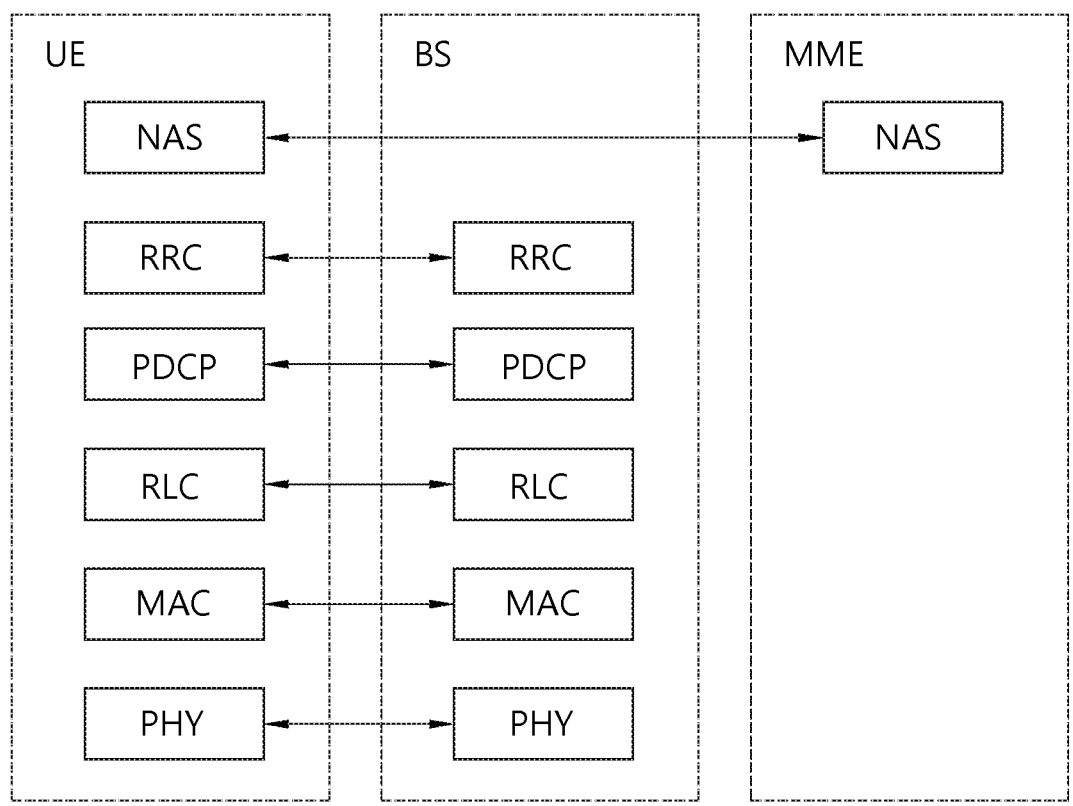
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs).

An RB is a logical path provided by the first layer (i.e., the PHY layer) and the second layer (i.e., the MAC layer, the RLC layer, and the PDCP layer) for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC-connected state, and otherwise the UE is in an RRC idle state.

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
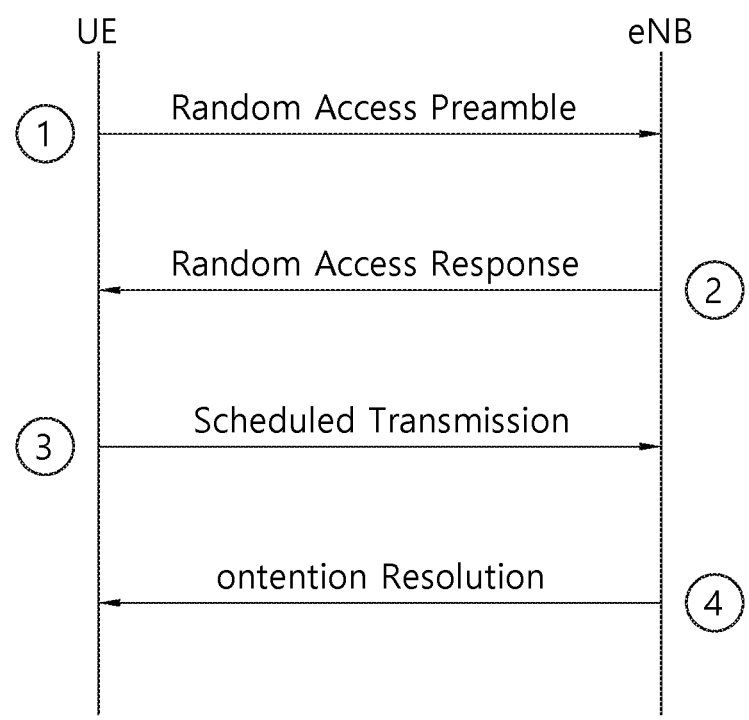
FIG. 4 shows an operation procedure between a user equipment and a base station in a contention based random access procedure.

FIG. 4 shows an operation procedure between a UE and a BS in a contention based random access procedure.

First, a UE in the contention based random access randomly may select a random access preamble within a group of random access preambles indicated through system information or a handover command, may select PRACH resources capable of transmitting the random access preamble, and then may transmit the selected random access preamble to a BS (Step 1).

After transmitting the random access preamble, the UE may attempt to receive a response with respect to its random access preamble within a random access response reception window indicated through the system information or the handover command (Step 2). More specifically, the random access response information is transmitted in a form of MAC PDU, and the MAC PDU may be transferred on the Physical Downlink Shared Channel (PDSCH). In addition, the Physical Downlink Control Channel (PDCCH) is also transferred such that the UE appropriately receives information transferred on the PDSCH. That is, the PDCCH may include information about a UE that should receive the PDSCH, frequency and time information of radio resources of the PDSCH, a transfer format of the PDSCH, and the like. Here, if the PDCCH has been successfully received, the UE may appropriately receive the random access response transmitted on the PDSCH according to information of the PDCCH. The random access response may include a random access preamble identifier (ID), an UL Grant, a temporary C-RNTI, a Time Alignment Command, and the like. Here, the random access preamble identifier is included in the random access response in order to notify UEs to which information such as the UL Grant, the temporary C-RNTI, and the Time Alignment Command would be valid (available, effective) because one random access response may include random access response information for one or more UEs. Here, the random access preamble identifier may be identical to the random access preamble selected by the UE in Step 1.

If the UE has received the random access response valid to the UE itself, the UE may process each of the information included in the random access response. That is, the UE stores the temporary C-RNTI. In addition, the UE uses the UL Grant so as to transmit data stored in a buffer of the UE or newly generated data to the BS (Step 3). Here, a UE identifier should be essentially included in the data which is included in the UL Grant (message 3). This is because, in the contention based random access procedure, the BS may not determine which UEs are performing the random access procedure, but later the UEs should be identified for contention resolution. Here, two different schemes may be provided to include the UE identifier. A first scheme is to transmit the UE's cell identifier through the UL Grant if the UE has already received a valid cell identifier allocated in a corresponding cell prior to the random access procedure. Conversely, the second scheme is to transmit the UE's unique identifier (e.g., S-TMSI or random ID) if the UE has not received a valid cell identifier prior to the random access procedure. In general, the unique identifier is longer than the cell identifier. In Step 3, if the UE has transmitted data through the UL Grant, the UE starts the contention resolution timer.

After transmitting the data with its identifier through the UL Grant included in the random access response, the UE waits for an indication (instruction) of the BS for the contention resolution. That is, the UE attempts to receive the PDCCH so as to receive a specific message (Step 4). Here, there are two schemes to receive the PDCCH. As described above, if the UE identifier transmitted via the UL Grant is the cell identifier, the UE attempts to receive the PDCCH by using its own cell identifier. If the UE identifier transmitted via the UL Grant is its unique identifier, the UE attempts to receive the PDCCH by using the temporary C-RNTI included in the random access response. Thereafter, for the former, if the PDCCH (message 4) is received through its cell identifier before the contention resolution timer is expired, the UE determines that the random access procedure has been successfully (normally) performed, thus to complete the random access procedure. For the latter, if the PDCCH is received through the temporary cell identifier before the contention resolution timer is expired, the UE checks data (message 4) transferred by the PDSCH that the PDCCH indicates. If the unique identifier of the UE is included in the data, the UE determines that the random access procedure has been successfully (normally) performed, thus to complete the random access procedure.

Hereinafter, connectionless transmission will be described.

In a 3GPP LTE system, a UE in an idle state needs to establish an RRC connection and a data connection before performing data transmission. That is, both a logical connection (RRC connection) between a BS and a UE and a logical connection (S1 connection/interface, EPS connection) between a mobility management entity (MME) and a UE need to be established.

Figure 5:
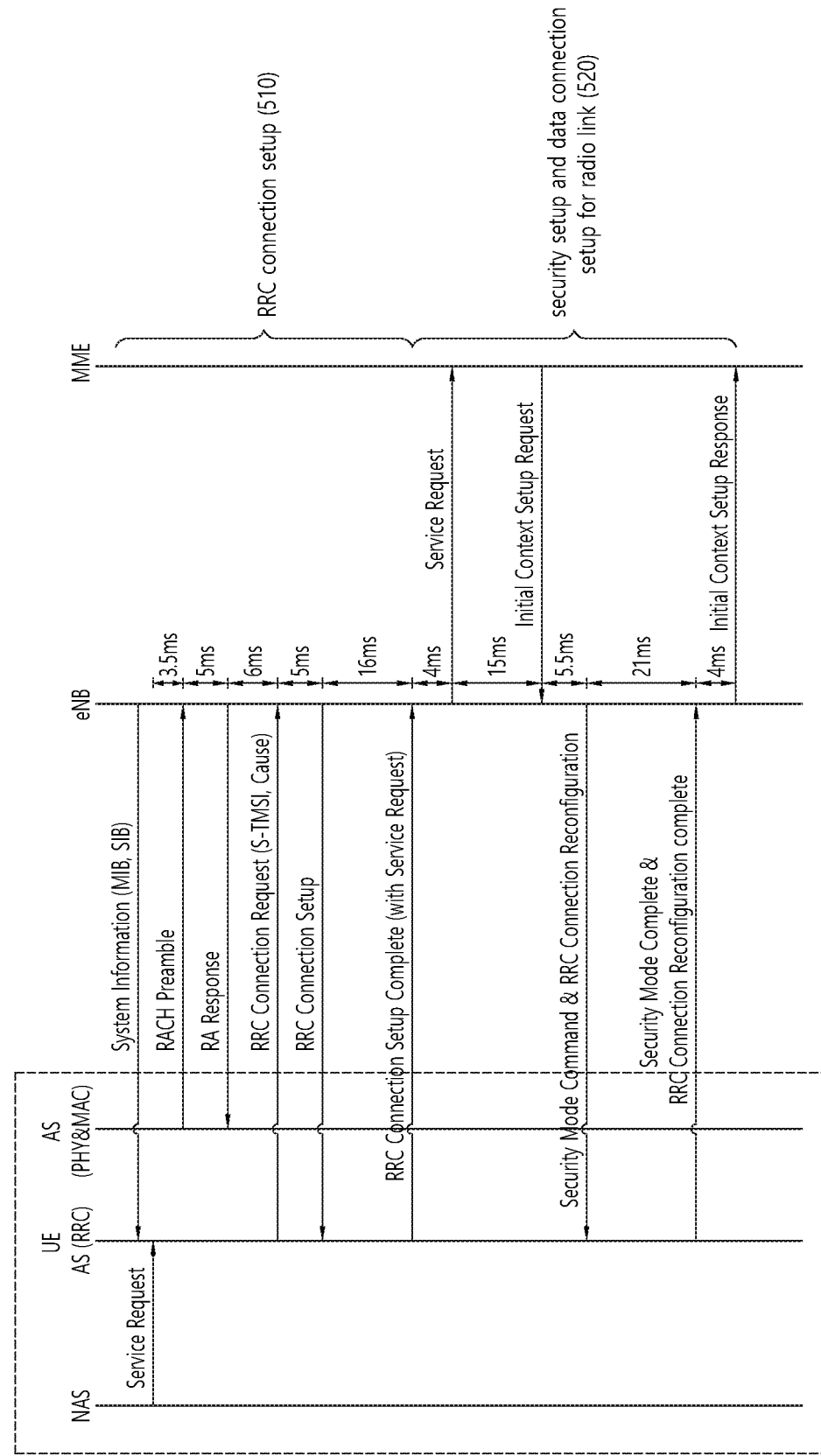
FIG. 5 shows a procedure and required time for connection setup in 3GPP LTE.

FIG. 5 shows a procedure and required time for connection setup in 3GPP LTE.

Referring to FIG. 5, a UE performs RRC connection setup 510 with a BS (eNB) before transmitting data. The UE receives system information, such as a master information block (MIB) and a system information block (SIB), from the BS. The UE transmits a random access preamble through an RACH resource and receives a random access response in response to the random access preamble. Then, the UE transmits an RRC connection request message to the BS and receives an RRC connection setup message from the BS. When the UE transmits an RRC connection setup complete message to the BS, RRC connection setup 510 may be achieved.

When RRC connection setup 510 with the BS is achieved, the UE performs security setup and data connection setup 520 for a radio link with a mobility management entity (MME). The BS makes a service request to the MME, and the MME transmits an initial context setup request to the BS. The BS transmits a security mode command and an RRC connection reconfiguration message to the UE. The UE transmits a security mode complete message and an RRC connection reconfiguration complete message to the BS. Then, the BS transmits an initial context setup request to the MME. Accordingly, the UE may achieve security setup and data connection setup 520 for the radio link with the MME.

Since a total of 35.5 ms is required for RRC connection setup 510 and a total of 49.5 ms for security setup and data connection setup 520 for the radio link, it takes 85 ms in total to switch the connection state of the UE in the idle state.

To transmit uplink data after switching the connection state of the UE, the UE needs to make a scheduling request to the BS. A procedure for transmitting uplink data and a delay caused thereby are described with reference to FIGS. 6 and 7.

Figure 6:
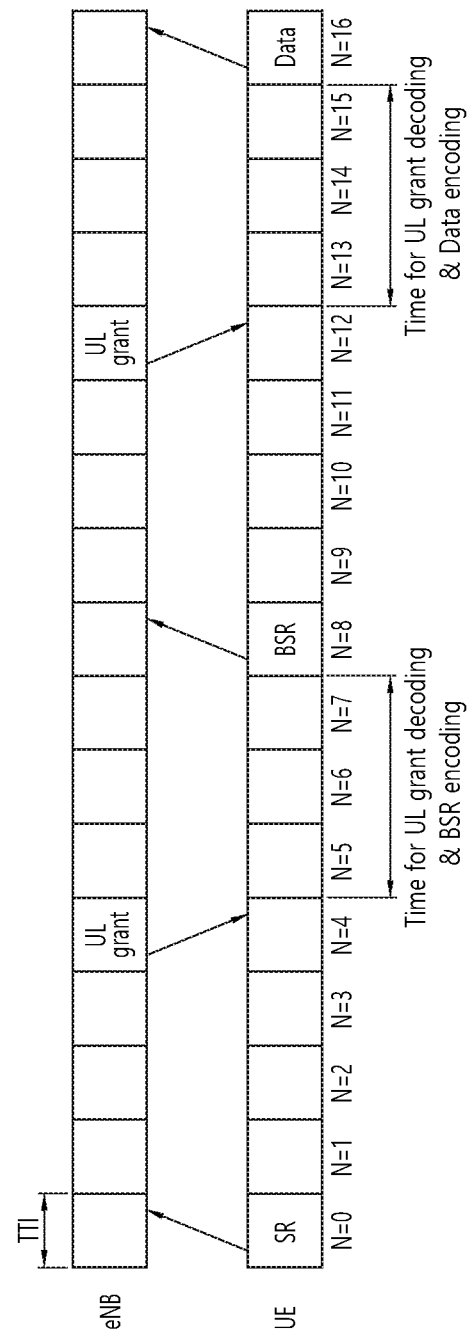
FIG. 6 shows time required for an uplink resource allocation scheme through a scheduling request in 3GPP LTE.

FIG. 6 shows time required for an uplink resource allocation scheme through a scheduling request in 3GPP LTE.

Referring to FIG. 6, a UE makes a scheduling request (SR) to a BS, and the BS transmits a UL grant to the UE. The UE decodes the UL grant and encodes a buffer status report (BSR) for a certain period of time. Then, the UE transmits the encoded BSR to the BS, the BS transmits a UL grant to the UE, and the UE transmits data to the BS according to the UL grant. This uplink resource allocation scheme through the UE's scheduling request may cause a total delay of 9.5 ms.

Figure 7:
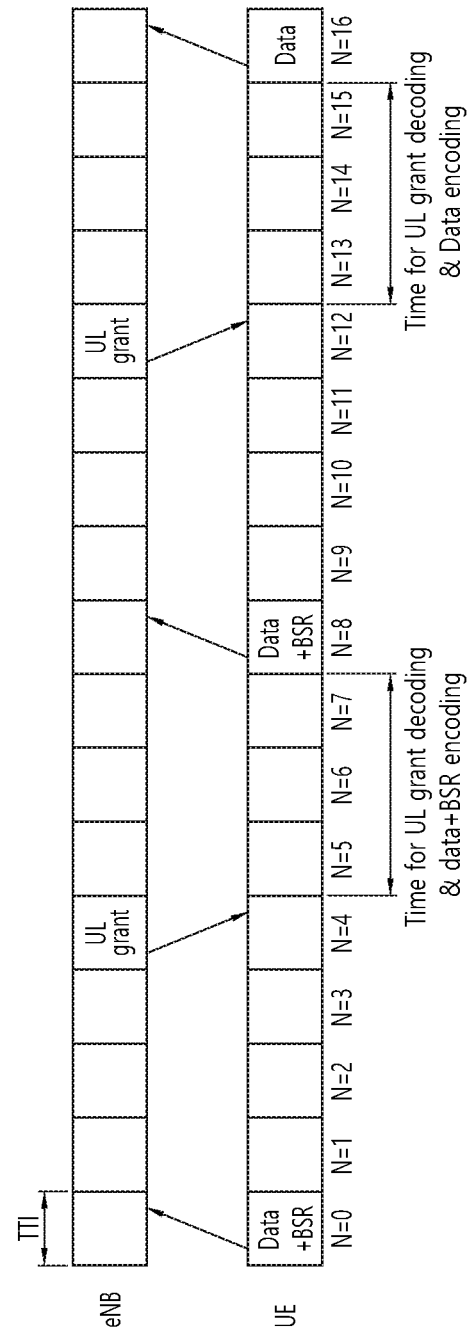
FIG. 7 shows time required for an uplink resource allocation scheme through a scheduling request and a buffer status report in 3GPP LTE.

FIG. 7 shows time required for an uplink resource allocation scheme through a scheduling request and a buffer status report in 3GPP LTE.

Referring to FIG. 7, a UE transmits data and a BSR to a BS, and the BS transmits a UL grant to the UE. The UE decodes the UL grant and encodes the data and the BSR for a certain period of time. Then, the UE transmits the encoded data and BSR to the BS, the BS transmits a UL grant to the UE, and the UE transmits data to the BS according to the UL grant. This uplink resource allocation scheme through the UE's scheduling request and BSR may cause a total delay of 17.5 ms.

That is, it may take 9.5 ms to 17.5 ms in total for a UE, which has switched to the connected state, to occupy a radio resource and to transmit data. Since it takes 85 ms in total to switch the connection state of a UE in the idle state, the total time required for the UE in the idle state to transmit data may be 94 ms to 102.5 ms. Therefore, a connectionless transmission scheme may be considered to reduce time delay caused by the connection state switch of the UE.

Generally, a UE that has no data to transmit switches to the idle state to save power or to reduce network overhead. The UE in the idle state needs to switch to the connected state in order to transmit or receive data. A connection state switch process generates a large amount of signaling between a BS and a UE. Since the UE needs to transmit a signal a plurality of times in order to process a large amount of signaling, battery consumption is increased and a delay occurs before data transmission. Thus, it is inefficient to establish a connection even when the UE transmits or receives a small amount of data once or twice. When a connectionless transmission scheme is applied, it is possible to reduce the number of signaling times for connection setup, thereby efficiently reducing a transmission delay and battery consumption.

UEs that transmit data after connection setup may estimate an uplink channel after a random access procedure is completed. However, since a UE performing connectionless transmission transmits uplink data during a random access procedure, it is necessary to estimate an uplink channel in the random access procedure. According to a random access scheme for an existing LTE system, since a random access preamble (message 1) is transmitted only in a designated resource region, channel information that a BS can obtain in a random access procedure is only information on a band in which the random access preamble is transmitted. While channel information on a particular band can be generalized to all bands in a narrowband system, it is necessary to perform channel estimation for each band in a wideband system. In particular, since a next-generation wireless communication system is expected to use a broadband of 100 MHz or greater, it is important to acquire channel information for each band.

A connectionless transmission procedure proposed in the present invention includes messages 1 to 4. Message 1 is a random access preamble that a UE transmits to a BS, and message 2 is a random access response that the BS transmits to the UE. Message 3 includes uplink data that the UE transmits to the BS using scheduling information included in message 2. Message 4 is a response signal that the BS transmits to the UE in response to the uplink data. Through the response signal of message 4, the UE can determine whether a signal transmitted by the UE via message 3 is successfully transmitted. The transmission of the signal by the UE may fail due to a poor channel state or the occurrence of a collision between different UEs.

In the connectionless transmission procedure, the BS performs scheduling for uplink data transmission in a state where only message 1 (preamble) is received. That is, when the BS knows transmission power for the preamble, the BS may select a modulation and coding scheme (MCS) level in uplink data transmission using a correlation peak value when detecting message 1.

A new radio access technology (RAT) can support a bandwidth (e.g., 100 MHz) five or more times a bandwidth supported by an existing LTE system. When a BS uses message 1 received only via a particular resource, it may be difficult to identify a channel per subband (e.g., per 50 MHz). Therefore, the BS needs to identify characteristics of a channel per subband (e.g., per 50 MHz) when receiving message 1.

In the present invention, random access preambles may be divided into a type 1 preamble and a type 2 preamble. Information included messages 2, 3, and 4 and a procedure from a random access procedure to data transmission may be changed depending on the type of a preamble. For example, a type 1 preamble may be allocated as a random access preamble for connection transmission, and a type 2 preamble may be allocated as a random access preamble for connectionless transmission. A BS receiving the type 1 preamble for connection transmission performs a procedure for connection setup between the BS and a UE after a random access procedure. A BS receiving the type 2 preamble for connectionless transmission performs data transmission and reception via a random access procedure.

Hereinafter, a method for transmitting a random access preamble for estimating an uplink channel on the basis of connectionless transmission will be described.

Figure 8:
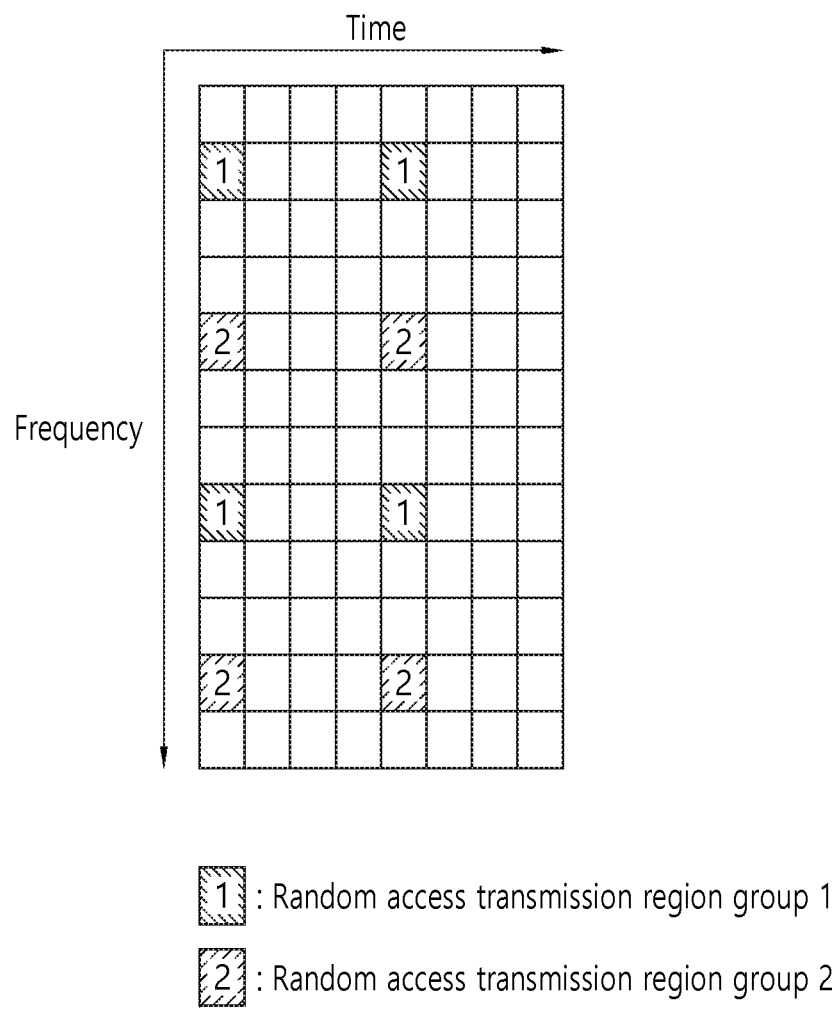
FIG. 8 shows an example of a resource region for transmitting a random access preamble according to an embodiment of the present invention.
Figure 9:
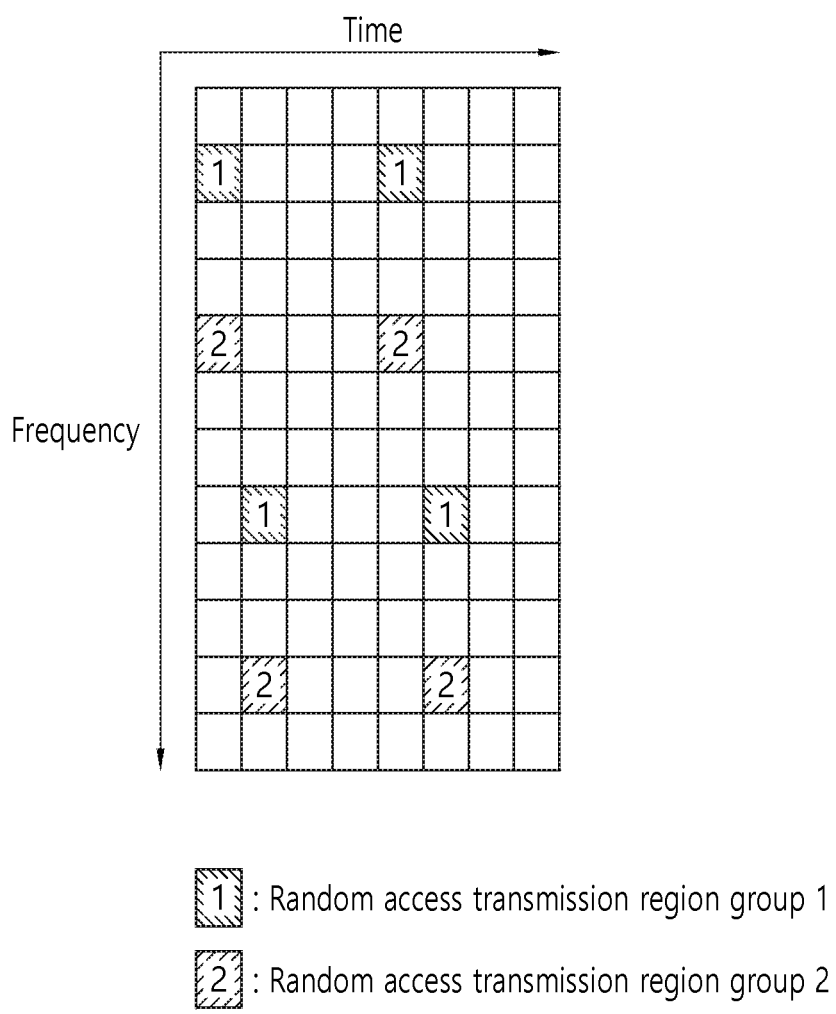
FIG. 9 shows another example of a resource region for transmitting a random access preamble according to an embodiment of the present invention.

FIG. 8 shows an example of a resource region for transmitting a random access preamble according to an embodiment of the present invention. FIG. 9 shows another example of a resource region for transmitting a random access preamble according to an embodiment of the present invention.

Defining terms, a type 1 preamble may correspond to a random access preamble for connection transmission. A type 2 preamble may correspond to a random access preamble for connectionless transmission. A random access transmission region may correspond to a resource region for transmitting a random access preamble. A plurality of transmission regions may correspond to a plurality of resource regions for transmitting a random access preamble. A single transmission region may correspond to a single resource region for transmitting a random access preamble.

First, a plurality of resource regions for transmitting a random access preamble is set and arranged noncontiguously. Some random access preambles are set as type 1 preambles, and others are set as type 2 preambles. The type 2 preambles may be divided into a preamble transmitted in a plurality of transmission regions (a plurality of resource regions for transmitting a random access preamble) and a preamble transmitted in a single transmission region (a single resource region for transmitting a random access preamble). A BS transmits allocation information on the type 1 preambles and the type 2 preambles to a UE as cell-common information.

Referring to FIGS. 8 and 9, a plurality of random access transmission regions is formed and is deployed apart in terms of frequency or time. FIG. 8 shows an example in which random access transmission regions are spaced apart in terms of frequency. FIG. 9 shows an example in which random access transmission regions are spaced apart in terms of frequency and time.

Further, a plurality of random access transmission regions may be grouped to form a random access transmission region group. FIGS. 8 and 9 show examples in which there are two random access transmission region groups, each of which includes two random access transmission regions.

The BS may form one of random access transmission region groups 1 and 2 or all of random access transmission region groups 1 and 2.

It is assumed that there are M orthogonal random access preambles in each random access transmission region. Among these random access preambles, M' preambles are allocated as type 2 preambles (for connectionless transmission), $M'_1$ preambles of which are allocated as preambles transmitted in a plurality of transmission regions, and $M'_2$ preambles of which are allocated as preambles transmitted in a single transmission region. Here, $M=M'_1+M'_2$, and both $M'_1$ and $M'_2$ are greater than zero. In the case where there are L random access transmission regions, when a preamble is transmitted in a plurality of transmission regions, the number of preambles identified by the BS is $M'_1$. When a preamble is transmitted in a single transmission region, the number of preambles identified by the BS is $M'_2$. When a preamble is transmitted in a plurality of transmission regions, the number of preambles identified by the BS is reduced, because the BS needs to be able to recognize that preambles are from the same UE even though the preambles are transmitted in different transmission regions. Accordingly, in one embodiment, a UE may perform random access using the same preamble in different transmission regions.

For example, a type 1 preamble is allocated for connection transmission. The preamble for connection transmission is transmitted only once in a single transmission region. Upon receiving the type 1 preamble, a BS transmits corresponding message 2 to a UE. When data transmission is performed after connection, detailed channel estimation may be performed at a subsequent step other than the preamble transmission step. Therefore, the preamble for connection transmission does not need to be transmitted in a plurality of random access transmission regions.

In another example, a type 2 preamble may be divided into a dedicated preamble allocated to a single UE and a common (shared) preamble available for all UEs. The dedicated preamble is for receiving a downlink signal and is used when a UE transmits a preamble and when a UE previously transmitting an uplink signal is allocated a preamble from a BS.

It is also necessary to use a dedicated preamble in connectionless transmission. When a downlink signal is received through connectionless transmission, a UE recognizes through a paging message that there is a downlink signal that the UE needs to receive. In this case, a BS may allocate a dedicated preamble to the UE, thereby avoiding a collision in a random access step. In addition, when the UE does not complete transmitting uplink data via message 3, it may be necessary to continuously transmit the uplink data. In this case, the BS may allocate a dedicated preamble, thereby avoiding a collision. Alternatively, the BS may allocate a dedicated preamble when requesting the retransmission of message 3.

The BS transmits information on a dedicated preamble group and a common preamble group to UEs as cell-common information, and transmits information for allocating a dedicated preamble to each UE. The BS assigns a preamble for receiving a downlink signal to a UE through a paging message.

Alternatively, a UE performing random access to receive a connectionless downlink signal transmits a random access preamble only in a single transmission region. Since it is not necessary to estimate an uplink channel in detail for the purpose of receiving a downlink signal, the UE transmits a random access preamble only in a single transmission region.

Alternatively, a UE performing random access for connectionless uplink transmission may transmit a preamble only in a single transmission region. Here, it is assumed that an uplink channel state is good in a cell. In a TDD system, a UE may predict characteristics of an uplink channel based on downlink channel estimation information and may select a region for transmitting a preamble. A BS receives a preamble, estimates an accurate channel quality, and transmits resource allocation, a symbol modulation scheme, and a code rate for message 3 via message 2.

Further, the UE predicts a channel state thereof based on long periodic channel information, such as reference signal received power (RSRP) and/or reference signal received quality (RSRQ). When the channel state is good, the UE transmits a random access preamble only in a single transmission region. When the channel state is bad, the UE transmits a random access preamble in a plurality of transmission regions.

Alternatively, a UE transmitting a type 2 preamble in a plurality of transmission regions always performs random access using an agreed preamble, which is for a BS to recognize that the preambles are transmitted from the same UE. For example, even though the UE transmits a preamble in a plurality of transmission regions, the BS may designate the UE to always transmit the same preamble.

Alternatively, it is assumed that power used per single subcarrier is P when a type 2 preamble is transmitted in a single transmission region. A UE that transmits a preamble in N random access transmission regions sets power per subcarrier to P/N, which is for matching the power consumption of a UE that transmits a random access preamble in a plurality of transmission regions and that of a UE that transmits a preamble in a single transmission region.

Alternatively, when a BS transmits a type 2 preamble for uplink transmission to a UE in order to improve channel estimation performance, the BS designates power consumed by the UE in advance. The BS may transmit the power designated in advance to the UE as cell-common information, and the power may be applied differently depending on whether a preamble is transmitted in a plurality of transmission regions or is transmitted in a single transmission region.

When the UE arbitrarily adjusts transmission power for a preamble on the basis of downlink channel quality, it is difficult for the BS to accurately predict uplink channel quality for the UE. Therefore, it is necessary for the UE to transmit a preamble with constant power. Also, in the case of transmitting a preamble in a single transmission region, uplink channel estimation may not be important, and thus designating transmission power for a preamble may be applied only to a preamble transmitted in a plurality of transmission regions.

Alternatively, a type 2 preamble transmitted only in a single transmission region and a type 2 preamble transmitted in a plurality of transmission regions are allocated a common random access temporary identifier (e.g., random access-radio network temporary identifier (RA-RNTI). The random access temporary identifier is generated according to a subframe index (or time index) and a frequency group index of a transmission region. A BS includes, in message 2, both a response message to the preamble in a single transmission region and a response message to the preamble in a plurality of transmission regions. It is advantageous that the same random access temporary identifier is allocated to preambles transmitted at the same time in order to save identifier resources. In addition, it is possible to save resources when transmitting message 2. When preambles are transmitted at the same time, a common temporary identifier is allocated. Therefore, as shown in FIG. 8, when random access transmission regions are resource regions spaced apart only in terms of frequency, a common temporary identifier may be used.

Also, random access temporary identifiers for a type 1 preamble and a type 2 preamble are set to be the same. The random access temporary identifiers are generated according to a subframe index (or time index) and a frequency group index of a transmission region. A BS includes both a response message to the type 1 preamble and a response message to the type 2 preamble in message 2.

Alternatively, a type 2 preamble transmitted only in a single transmission region and a type 2 preamble transmitted in a plurality of transmission regions are allocated different random access temporary identifiers (e.g., RA-RNTI). A random access temporary identifier for the type 2 preamble in the single transmission region is determined according to a subframe index (or time index) and a subcarrier index (or frequency index). A random access temporary identifier for the type 2 preamble in the plurality of transmission regions is generated according to a subframe index (or time index) and a frequency group index. A BS separately generates message 2 corresponding to the type 2 preamble in the single transmission region and message 2 corresponding to the type 2 preamble in the plurality of transmission regions.

When random access transmission regions exist in different subframes, different temporary identifiers are allocated to a type 2 preamble in a single transmission region and a type 2 preamble in a plurality of transmission regions, thereby quickly transmitting message 2. Further, when transmitting a preamble in a plurality of transmission regions, it is appropriate that a BS transmits message 2 after receiving a preamble in the last resource region, and thus a temporary identifier needs to be separately allocated. That is, when preambles are transmitted at different times, individual temporary identifiers are allocated to the respective preambles. Therefore, as shown in FIG. 9, when random access transmission region are resource regions spaced apart in terms of frequency and time, individual temporary identifiers may be used.

Further, even when a type 2 preamble transmitted only in a single transmission region and a type 2 preamble transmitted in a plurality of transmission regions are transmitted in the same subframe, the preambles are allocated different random access temporary identifiers. When the content of message 2 corresponding to a response signal to the type 2 preamble in the single transmission region is different from that corresponding to a response signal to the type 2 preambles in the plurality of transmission regions, it may be necessary to separately transmit the response signal to the type 2 preamble in the single transmission region and the response signal to the type 2 preambles in the plurality of transmission regions.

In addition, a type 1 preamble and a type 2 preamble transmitted in a single transmission region are allocated the same random access temporary identifier. The temporary identifier is determined according to a subframe index (or time index) and a subcarrier index (or frequency index). A BS sets a response signal to the type 1 preamble and a response signal to the type 2 preamble in the single transmission region together in message area 2 and generates a response signal to a type 2 preamble in a plurality of transmission regions in separate message 2.

Both the type 1 preamble and the type 2 preamble in the single transmission region are characterized as being transmitted only once. Therefore, since the BS does not need to wait for a signal until all preambles are received, unlike the type 2 preamble in the plurality of transmission regions, the BS generates message 2 first and transmits message 2 to a UE.

That is, a scheme for allocating different random access temporary identifiers to a type 2 preamble transmitted only in a single transmission region and a type 2 preamble transmitted in a plurality of transmission regions has a longer response time than a scheme for allocating a common temporary identifier to a type 2 preamble transmitted only in a single transmission region and a type 2 preamble transmitted in a plurality of transmission regions but can guarantee maximum transmission power for a preamble.

Alternatively, a transmission format for message 3 is determined depending on whether a preamble is for uplink transmission or for downlink transmission. A BS performs scheduling by predicting the data size of message 3 according to whether a preamble received by the BS is for uplink transmission or for downlink signal reception and predicts a signal format when receiving message 3.

In connectionless uplink data transmission, uplink data is transmitted via message 3. In connectionless downlink data reception, however, UE authentication information is transmitted via message 3. Therefore, it is necessary for a BS to distinguish between uplink transmission and downlink transmission through a preamble and to perform different scheduling for message 3.

In addition, an existing LTE system may apply a connectionless transmission procedure. Here, the number of type 2 preambles may be set differently for each random access transmission region. For example, in the LTE system, random access resources (random access channel (RACH) regions) are already set for connection transmission. When there is a UE supporting the existing LTE system in a system, the legacy UEs can perform random access only in the random access resources for connection transmission. Therefore, it is necessary to allocate only a smaller number of preambles for connectionless transmission in the random access resources than in other resources. Some of the dedicated preambles in the random access resources for connection transmission may be allocated as preambles for connectionless transmission, thereby allocating a preamble for connectionless transmission in a situation where a legacy UE exists.

For example, it is assumed that the number of type 2 preambles in resource region 1 is $K_1$ and the number of type 2 preambles in resource region 2 is $K_2$, where $K_1$ is equal to or greater than $K_2$. Some of the preambles in resource region 2 are allocated commonly for UEs transmitting a type 2 preamble in both resource regions 1 and 2.

For example, it is assumed that there are preambles A, B, C, and D in resource region 1, and preambles E and F in resource region 2. Here, preamble sets (A, E), (B, E), (C, F), and (D, F) are configured for transmitting a preamble in a plurality of transmission regions. A BS determines different preamble sets as different UEs.

According to the foregoing example, it is possible to efficiently use a preamble. However, when UE 1 uses preamble set (A, E) and UE 2 uses preamble set (B, E), channel estimation performance may be distorted. In this case, the BS recognizes that random access requests are received from different UEs by receiving preamble A and preamble B through resource region 1 and then performs channel estimation in resource region 2 through resource region 2. However, since the preambles in resource region 2 are the same as E, a collision occurs, making it difficult for the BS to accurately estimate a channel.

However, it is possible to resolve the above problem using an implementation technique. When UE 1 and UE 2 are at different positions, preambles transmitted respectively by UE 1 and UE 2 reach the BS at different times. In this case, the BS may have two peak values when calculating the autocorrelation value of preamble E. The peak value of UE 1 and the peak value of UE 2 can be distinguished from each other by applying the time advances (TA) value of UE 1 and UE 2 obtained in resource region 1. When the peak values are distinguished, channel qualities for UE 1 and UE 2 can be predicted using the respective peak values. Accordingly, channel estimation in resource region 1 and resource region 2 can be performed.

Also, in a random access procedure using a preamble for connectionless transmission, a connectionless transmission procedure may be changed depending on whether a preamble is transmitted in a single transmission region or in a plurality of transmission regions. For example, a different procedure is used when a preamble is transmitted in a single transmission region in order to receive downlink data from when a preamble is transmitted in a single transmission region in order to transmit uplink data. Alternatively, when the same connectionless uplink data transmission is performed not via message 3 but in a subsequent step, channel estimation may be performed after a random access procedure. Therefore, in this case, it is appropriate to transmit a preamble only in a single transmission region, and a BS may receive the preamble in the single transmission region and may determine a subsequent procedure. This is because it is not necessary to perform channel estimation in detail during the random access procedure.

In a random access procedure using a preamble for connectionless transmission, a different preamble for use may be set according to the size of uplink data to be transmitted. In uplink data transmission in a connectionless transmission procedure, it is considered to share in advance the size of data to be transmitted via message 3 between a BS and a UE. However, when the data size is identified via a preamble, it is possible to efficiently schedule message 3.

Figure 10:
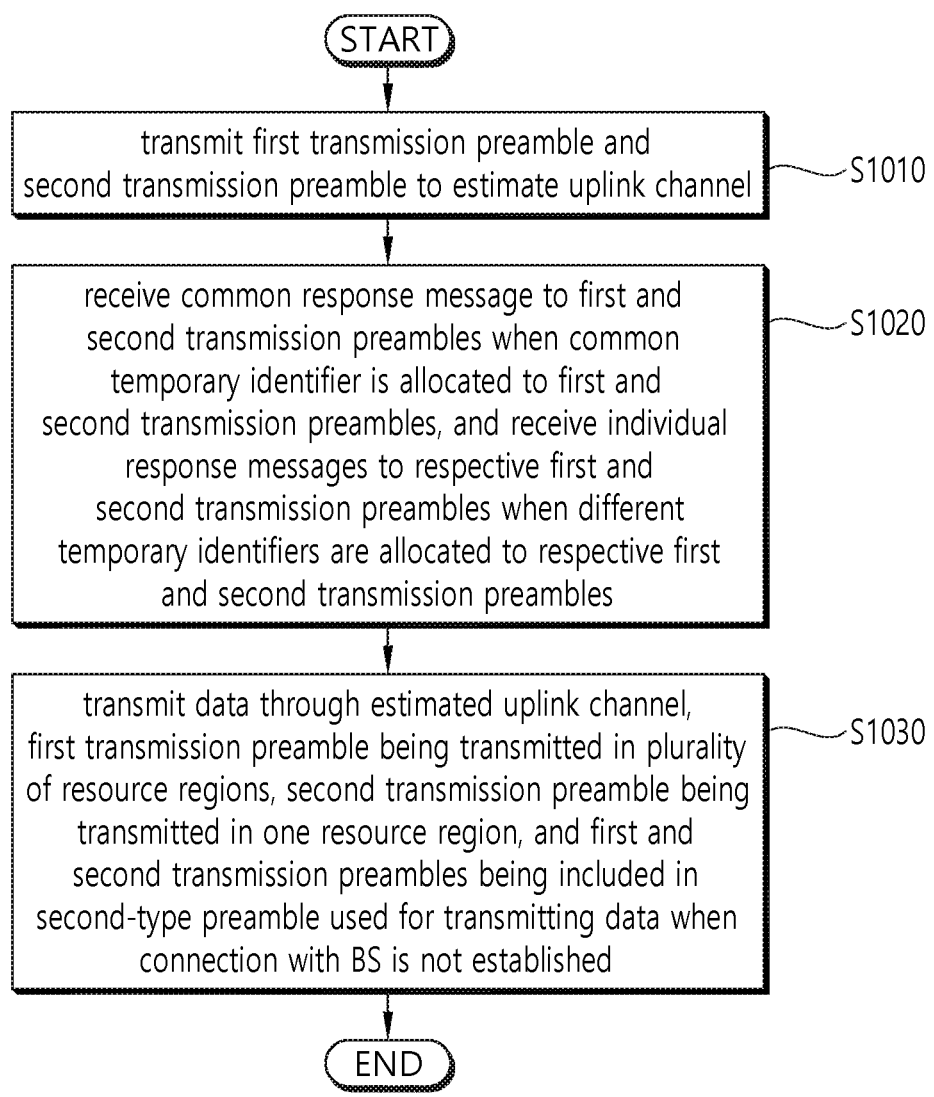
FIG. 10 is a flowchart illustrating a procedure for transmitting data on the basis of connectionless transmission according to an embodiment of the present invention.

FIG. 10 is a flowchart illustrating a procedure for transmitting data on the basis of connectionless transmission according to an embodiment of the present invention.

Defining terms first, a connectionless transmission procedure may correspond to a procedure in which a UE transmits data in a state where a connection between the UE and the BS is not established. Further, the connectionless transmission procedure may correspond to a procedure in which a UE transmits data to a BS in a situation that is not considered as a normal connection state. For example, a case where a radio link failure (RLF) occurs or a case where a UE cannot sense a transmission beam from a BS or senses a very weak beam and thus performs a beam recovery procedure may correspond to a connectionless transmission procedure. A first-type preamble may correspond to a type 1 preamble, which is a random access preamble for connection transmission. A second-type preamble may correspond to a type 2 preamble, which is a random access preamble for connectionless transmission. The second-type preamble includes a first transmission preamble and a second transmission preamble. The first transmission preamble may correspond to a random access preamble for connectionless transmission that is transmitted in a plurality of resource regions. The second transmission preamble may correspond to a random access preamble for connectionless transmission that is transmitted in a single resource region. A plurality of transmission regions may correspond to a plurality of resource regions in which a random access preamble is transmitted.

A single transmission region may correspond to a single resource region in which a random access preamble is transmitted. A plurality of resource regions is interchangeable with a plurality of transmission regions. One resource region is interchangeable with a single transmission region. A temporary identifier may include an RA-RNTI.

First, in step S1010, a UE transmits a first transmission preamble and/or a second transmission preamble to a BS in order to estimate an uplink channel. The first transmission preamble and the second transmission preamble are included in a second-type preamble (for connectionless transmission) that is used for transmitting data in a state where a connection between the UE and the BS is not established. That is, the UE transmits the first transmission preamble and/or the second transmission preamble to the BS in order to perform a connectionless transmission procedure. In the connectionless transmission procedure, since data is transmitted while performing a random access procedure, channel estimation needs to be performed when transmitting a preamble. The first transmission preamble and/or the second transmission preamble may correspond to message 1 in the random access procedure.

The first transmission preamble is transmitted in a plurality of resource regions, and the second transmission preamble is transmitted in one resource region. According to an embodiment of the present invention, the first transmission preamble may be used when an uplink channel needs to be estimated for each subband in the connectionless transmission procedure in a broadband system, and the second transmission preamble may be used when the second-type preamble is used for receiving a downlink signal or when an uplink channel can be estimated based on downlink channel estimation information. That is, the second transmission preamble may be used when a random access procedure is performed to receive downlink data or when channel quality is good enough to fully predict an uplink channel state.

In step S1020, when a common temporary identifier is allocated to the first transmission preamble and the second transmission preamble, the UE receives a common response message to the first transmission preamble and the second transmission preamble. When different temporary identifiers are respectively allocated to the first transmission preamble and the second transmission preamble, the UE receives an individual response message to each of the first transmission preamble and the second transmission preamble. The common response message and the individual response message may correspond to message 2 in the random access procedure.

When the first transmission preamble and the second transmission preamble are transmitted at the same time, it is advantageous to allocate the same temporary identifier (common temporary identifier) for the saving of identifier resources. Further, when a response message to the first transmission preamble and a response message to the second transmission preamble are transmitted at a time as a common response message to transmit message 2, it is possible to save resources.

When the first transmission preamble and the second transmission preamble are transmitted at different times (e.g., when these preambles are present in different subframes), different temporary identifiers are allocated to the respective preambles, thereby quickly transmitting a response message to each preamble. For example, when the second transmission preamble is transmitted prior to the first transmission preamble, a response message to the second transmission preamble may be transmitted prior to a response message to the first transmission preamble.

The common temporary identifier and the different temporary identifiers may be determined based on a subframe index and a frequency index of resource regions for transmitting the first transmission preamble and the second transmission preamble.

The resource regions for transmitting the first transmission preamble and the second transmission preamble may be spaced apart from each other in the frequency domain or may be spaced apart from each other in the frequency and time domains. That is, spacing the resource regions for transmitting the first transmission preamble and the second transmission preamble in the frequency domain means that the first transmission preamble and the second transmission preamble are transmitted at the same time. Thus, a common temporary identifier may be allocated to the first transmission preamble and the second transmission preamble. Spacing the resource regions for transmitting the first transmission preamble and the second transmission preamble in the frequency and time domains means that the first transmission preamble and the second transmission preamble are transmitted at different times. Accordingly, different temporary identifiers may be allocated to the first transmission preamble and the second transmission preamble, respectively.

The common response message or the individual response messages include scheduling information for data that can be transmitted through an uplink channel estimated using the first transmission preamble and the second transmission preamble. That is, the BS may transmit, via message 2, an uplink (UL) grant for transmitting uplink data through the uplink channel estimated using the preambles.

In step S1030, the UE transmits data to the BS through the estimated uplink channel. The data may correspond to message 3 in the random access procedure. Here, when the first transmission preamble and the second transmission preamble are transmitted for uplink transmission, the data may correspond to uplink data. When the first transmission preamble and the second transmission preamble are transmitted for downlink signal reception, the data may include information for authenticating the UE. When the UE receives a response signal to the data from the BS, the random access procedure is terminated. The response signal to the data may correspond to message 4 in the random access procedure.

When the UE wishes to perform a random access procedure to the BS based on a connection transmission procedure, the UE may transmit a first-type preamble used for transmitting data in a state where the UE is connected to the BS. Here, when the common temporary identifier is allocated to the first-type preamble, a response message to the first-type preamble may be included in the common response message.

Power consumed for transmitting the first transmission preamble is set to a value predetermined between the BS and the UE. The BS may transmit the predetermined transmission power for the first transmission preamble to the UE as cell-common information. Also, power consumed for transmitting the second transmission preamble is set to be equal to the power consumed for transmitting the first transmission preamble. That is, the power consumption of the UE that transmits a random access preamble in a plurality of transmission regions and the power consumption of the UE that transmits a random access preamble in a single transmission region are matched.

The second-type preamble includes a dedicated preamble allocated to one UE and a common preamble assigned to all UEs in a cell. The dedicated preamble is used when the second-type preamble is used to receive the downlink signal. That is, the BS allocates a dedicated preamble to a UE so as to avoid a collision in the random access procedure.

Figure 11:
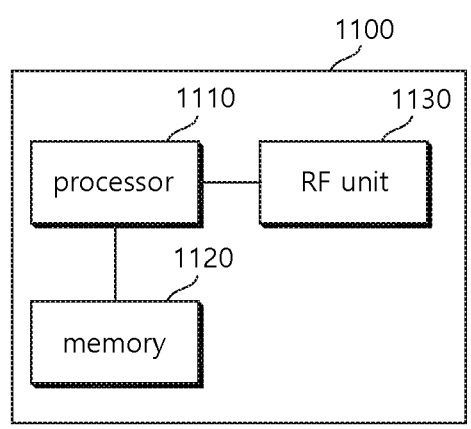
FIG. 11 is a block diagram showing an apparatus for wireless communication for implementing an embodiment of the present invention.

FIG. 11 is a block diagram showing an apparatus for wireless communication for implementing an embodiment of the present invention.

An apparatus 1100 for wireless communication includes a processor 1110, a memory 1120 and a radio frequency (RF) unit 1130.

The processor 1110 may be configured to implement proposed functions, procedures and/or methods described in this description. Layers of the radio interface protocol may be implemented in the processor 1110. The processor 1110 may handle a procedure explained above. The memory 1120 is operatively coupled with the processor 1110, and the RF unit 1130 is operatively coupled with the processor 1110.

The processor 1110 may include application-specific integrated circuit (ASIC), other chipset, logic circuit and/or data processing device. The memory 1120 may include read-only memory (ROM), random access memory (RAM), flash memory, memory card, storage medium and/or other storage device. The RF unit 1130 may include baseband circuitry to process radio frequency signals. When the embodiments are implemented in software, the techniques described herein can be implemented with modules (e.g., procedures, functions, and so on) that perform the functions described herein. The modules can be stored in memory 1120 and executed by processor 1110. The memory 1120 can be implemented within the processor 1110 or external to the processor 1110 in which case those can be communicatively coupled to the processor 1110 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method for transmitting, by a user equipment (UE), data in a wireless communication system, the method comprising:
   transmitting a first transmission preamble and a second transmission preamble to estimate an uplink channel;
   receiving a common response message to the first and second transmission preambles based on a common temporary identifier being allocated to the first and second transmission preambles, and receiving individual response messages to the respective first and second transmission preambles based on different temporary identifiers being allocated to the respective first and second transmission preambles; and
   transmitting data through the estimated uplink channel,
   wherein the first transmission preamble is transmitted in a plurality of resource regions, and the second transmission preamble is transmitted in one resource region.

2. The method of claim 1, wherein the first and second transmission preambles are comprised in a second-type preamble which is used for transmitting data in a state in which a connection with a base station (BS) is not established.

3. The method of claim 2, further comprising:
   transmitting a first-type preamble which is used for transmitting data in a state of being connected to the BS,
   wherein a response message to the first-type preamble is comprised in the common response message based on the common temporary identifier being allocated to the first-type preamble.

4. The method of claim 2, wherein the second transmission preamble is used based on (i) the second-type preamble being used to receive a downlink signal, or (ii) the uplink channel being estimated based on downlink channel estimation information.

5. The method of claim 4, wherein the second-type preamble comprises a dedicated preamble allocated to one UE and a common preamble assigned to all UEs in a cell, and the dedicated preamble is used based on the second-type preamble being used to receive the downlink signal.

6. The method of claim 1, wherein the common temporary identifier and the different temporary identifiers are determined based on a subframe index and a frequency index of resource regions for transmitting the first and second transmission preambles.

7. The method of claim 6, wherein the resource regions for transmitting the first and second transmission preambles are spaced apart in a frequency domain or are spaced apart in frequency and time domains.

8. The method of claim 1, wherein power consumed for transmitting the first transmission preamble is set to a value predetermined between a BS and the UE, and power consumed for transmitting the second transmission preamble is set to be equal to the power consumed for transmitting the first transmission preamble.

9. A user equipment (UE) configured to transmit data in a wireless communication system, the UE comprising:
   a radio frequency (RF) unit;
   at least one processor; and
   at least one computer memory operably connectable to the at least one processor and storing instructions that, based on being executed by the at least one processor, perform operations comprising:
   transmitting, via the RF unit, a first transmission preamble and a second transmission preamble to estimate an uplink channel;
   receiving, via the RF unit, a common response message to the first and second transmission preambles based on a common temporary identifier being allocated to the first and second transmission preambles, and receiving individual response messages to the respective first and second transmission preambles based on different temporary identifiers being allocated to the respective first and second transmission preambles; and
   transmitting, via the RF unit, data through the estimated uplink channel,
   wherein the first transmission preamble is transmitted in a plurality of resource regions, and the second transmission preamble is transmitted in one resource region.

10. The UE of claim 9, wherein the first and second transmission preambles are comprised in a second-type preamble which is used for transmitting data in a state in which a connection with a base station (BS) is not established.

11. The UE of claim 10, wherein the operations further comprise:
transmitting a first-type preamble which is used for transmitting data in a state of being connected to the BS,
wherein a response message to the first-type preamble is comprised in the common response message based on the common temporary identifier being allocated to the first-type preamble.

12. The UE of claim 10, wherein the second transmission preamble is used based on (i) the second-type preamble being used to receive a downlink signal, or (ii) the uplink channel being estimated based on downlink channel estimation information, and
wherein the second-type preamble comprises a dedicated preamble allocated to one UE and a common preamble assigned to all UEs in a cell, and the dedicated preamble is used based on the second-type preamble being used to receive the downlink signal.

13. The UE of claim 9, wherein the common temporary identifier and the different temporary identifiers are determined based on a subframe index and a frequency index of resource regions for transmitting the first and second transmission preambles.

14. The UE of claim 13, wherein the resource regions for transmitting the first and second transmission preambles are spaced apart in a frequency domain or are spaced apart in frequency and time domains.

15. The UE of claim 9, wherein power consumed for transmitting the first transmission preamble is set to a value predetermined between a BS and the UE, and power consumed for transmitting the second transmission preamble is set to be equal to the power consumed for transmitting the first transmission preamble.

16. A processing device configured to control a user equipment (UE) to transmit data in a wireless communication system, the processing device comprising:
at least one processor; and
at least one computer memory operably connectable to the at least one processor and storing instructions that, based on being executed by the at least one processor, perform operations comprising:
transmitting a first transmission preamble and a second transmission preamble to estimate an uplink channel;
receiving a common response message to the first and second transmission preambles based on a common temporary identifier being allocated to the first and second transmission preambles, and receiving individual response messages to the respective first and second transmission preambles based on different temporary identifiers being allocated to the respective first and second transmission preambles; and
transmitting data through the estimated uplink channel,
wherein the first transmission preamble is transmitted in a plurality of resource regions, and the second transmission preamble is transmitted in one resource region.

17. The processing device of claim 16, wherein the first and second transmission preambles are comprised in a second-type preamble which is used for transmitting data in a state in which a connection with a base station (BS) is not established.

18. The processing device of claim 17, wherein the operations further comprise:
transmitting a first-type preamble which is used for transmitting data in a state of being connected to the BS,
wherein a response message to the first-type preamble is comprised in the common response message based on the common temporary identifier being allocated to the first-type preamble.

19. The processing device of claim 17, wherein the second transmission preamble is used based on (i) the second-type preamble being used to receive a downlink signal, or (ii) the uplink channel being estimated based on downlink channel estimation information, and
wherein the second-type preamble comprises a dedicated preamble allocated to one UE and a common preamble assigned to all UEs in a cell, and the dedicated preamble is used based on the second-type preamble being used to receive the downlink signal.

20. The processing device of claim 16, wherein the common temporary identifier and the different temporary identifiers are determined based on a subframe index and a frequency index of resource regions for transmitting the first and second transmission preambles, and
wherein the resource regions for transmitting the first and second transmission preambles are spaced apart in a frequency domain or are spaced apart in frequency and time domains.

* * * * *